United States Patent [19]
Morton et al.

[11] Patent Number: 5,124,726
[45] Date of Patent: Jun. 23, 1992

[54] NON-IMPACT PRINTER APPARATUS FOR GREY LEVEL PRINTING

[75] Inventors: Roger A. Morton, Penfield; Kevin C. Scott, Rochester, both of N.Y.

[73] Assignee: Eastman Kodak Company, Rochester, N.Y.

[21] Appl. No.: 451,897

[22] Filed: Dec. 18, 1989

[51] Int. Cl.$^5$ .................. G01D 9/42; H03K 21/08
[52] U.S. Cl. .................. 346/107 R; 377/114
[58] Field of Search .................. 346/107 R, 154; 377/110, 114, 107; 358/298

[56] References Cited

U.S. PATENT DOCUMENTS

| | | | |
|---|---|---|---|
| 3,850,517 | 11/1974 | Stephany et al. | 354/12 |
| 4,563,693 | 1/1986 | Masaki | 358/298 X |
| 4,596,995 | 6/1980 | Yamakawa et al. | 346/160 |
| 4,731,673 | 3/1988 | Yamakawa | 346/160 |
| 4,746,941 | 5/1988 | Pham et al. | 346/154 |
| 4,831,395 | 5/1989 | Pham et al. | 346/154 |
| 4,885,597 | 12/1989 | Tscharg et al. | 364/519 |

OTHER PUBLICATIONS

S. Madhu, Electronics: Circuits and Systems, 1985, pp. 768–771.

Primary Examiner—Benjamin R. Fuller
Assistant Examiner—David Yockey
Attorney, Agent, or Firm—Norman Rushefsky

[57] ABSTRACT

In a non-impact printer apparatus, such as an LED printer, multiple bits of image data determining the on-time of each LED for generating a grey level pixel are latched into an appropriate data register from a data bus in accordance with a token bit that is passed along a shift register. The data register for each LED comprises a series of cascaded registers coupled as a ripple counter. Each of these registers stores a respective binary weighted data bit. In response to a clock signal at one of the clock inputs of one register the counter effectively counts down to a zero output condition and thereby directly controls LED enablement time.

7 Claims, 2 Drawing Sheets

NON-IMPACT PRINTER APPARATUS FOR GREY LEVEL PRINTING

BACKGROUND OF THE INVENTION

1. Field of the Invention

The present invention relates to a non-impact printer apparatus for printing characters, halftone images and the like with small pixels (dots) of variable size.

2. Description of the Prior Art

Various recording element sections or printer heads for use in dot printers that form output images with dots are known. Examples of such heads include a wire dot printer head, an electrostatic printer head, an ink-jet printer head, a thermal printer head, an LED (light emitting diode) array printer head and the like. An LED array printer head having 8 or more elements per mm as the dot generating elements is known to provide extremely high resolution. When this head is used in place of an optical scanning mechanism in a conventional electrophotographic copying machine, a printer can be realized in which an array of LED's is selectively turned on in accordance with a video signal to form an electrostatic latent image on a surface of an adjacent photosensitive recording member and a visualized image is obtained through development of the recording member and transfer of the developed image onto a transfer sheet. In a printer of this type, a portion corresponding to the "ON" LED's can be formed into a black or white image portion by changing the charging conditions or toner used for development.

In U.S. Pat. No. 4,596,995, examples of printers of the kind referred to above are described. In printers described in this apparatus, registers are provided for latching image data signals to respective LED's or recording elements to be enabled. In order to determine which register is to latch an image data signal rather complex circuitry in the form of a counter and decoder is provided to generate a signal to allow a register to latch the data from a data bus.

An improvement to this printer is described in U.S. Pat. No. 4,746,941. In the printer of this patent grey level or multibit data is furnished over a bus or a plurality of lines to the printhead. Data storage latches associated with each line and each LED selectively receive the data in response to a token bit signal shifted down a shift register. The token bit thus determines which LED the data is intended for and provides for an efficient means of providing for data distribution to the printhead. However, the printer apparatus of this patent is relatively complex and requires, in addition to the latches, comparators and counters to control the varying duration of an LED dot or pixel exposure period.

It is an object of the invention, therefore, to provide printer apparatus with a simplified circuitry for receiving and printing grey level data.

SUMMARY OF THE INVENTION

The objects of the present invention are realized by a non-impact printer apparatus comprising a recording head having a plurality of recording elements for recording on a recording medium; driving means including current driving means for selectively driving said plurality of recording elements in accordance with respective image data signals; said driving means further including respective data register means associated with each recording element for storing said image data signals; data bus means for carrying a multibit image data signal; means commonly connecting said data bus means to said data register means; a multistage shift register means for outputting sequentially at respective stages a token bit signal for sequentially selecting a respective data register means for accepting a multibit image data signal; means for providing a clock signal; and wherein the data register means associated with each recording element includes a series of cascaded registers for storing respective data bits for recording a pixel and for shifting respective data bits from one register storing a data bit for that pixel to another register storing another data bit for that pixel in response to a clock signal.

The above and other objects and features of the present invention will become apparent from the following description taken in conjunction with the accompanying drawings.

BRIEF DESCRIPTION OF THE DRAWINGS

The subsequent description of a preferred embodiment of the present invention refers to the attached drawings wherein.

DESCRIPTION OF THE PREFERRED EMBODIMENT

Because apparatus of the type described herein are well known, the present description will be directed in particular to elements forming part of, or cooperating more directly with, the present invention.

Figure 1:
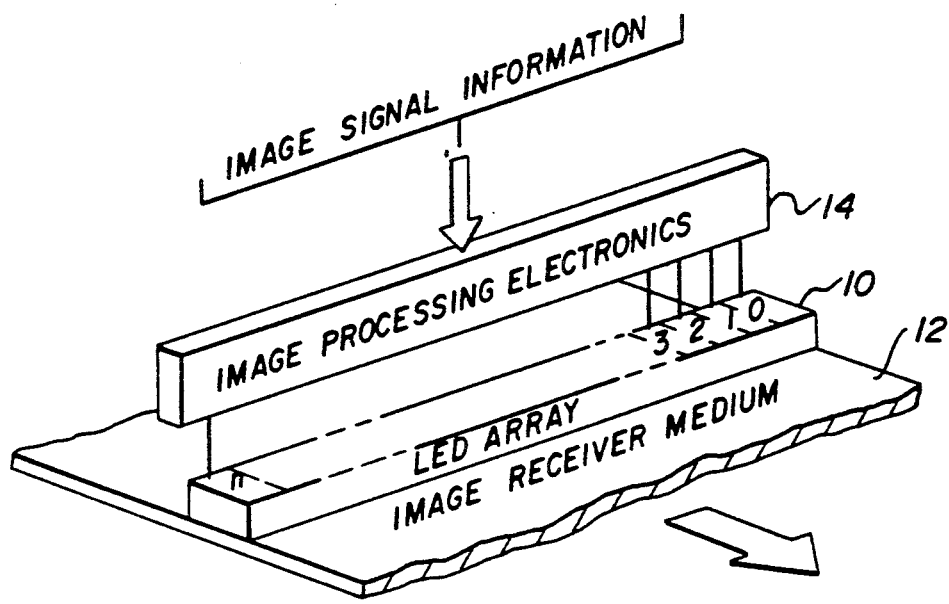
FIG. 1 is a perspective view illustrating the general arrangement of a prior art non-impact printer apparatus.

The apparatus for the herein disclosed invention is typified by the diagram of FIG. 1: a linear array 10 of 3584 triggerable recording elements; e.g. LED's, is disposed to expose selectively a photosensitive image-receiver medium 12 that is movable relative to the array by suitable conventional means (not shown). Optical means for focusing the LED's onto the medium may also be provided. In this regard, gradient index optical fiber devices such as Selfoc (trademark of Nippon Sheet Glass Co., Ltd.) arrays are highly suited. The LED's of the array are triggered into operation by means of image processing electronics 14 that are responsive to image signal information. Depending on the duration for which any given LED is turned on, the exposure effected by such LED is more or less made. Where the medium 12 is, say, photographic film the latent image formed line by line by selective exposure of said LED's may be subsequently developed by conventional means to form a visible image. Where the medium 12 is an electrophotographic receptor, the LED's may be used to form an electrostatic image on a uniformly electrostatically charged photoconductor and this image developed using opaque toner particles and perhaps transferred to a copy sheet, see U.S. Pat. No. 3,850,517, the contents of which are incorporated herein by this reference. The LED's may be shaped or the optics focussing the LED's may cause the image of an LED to be formed as an ellipse with the major axis of the ellipse being directed in the main scanning direction; i.e., transverse to the direction of movement of the image receiver medium relative to the printhead.

Figure 2:
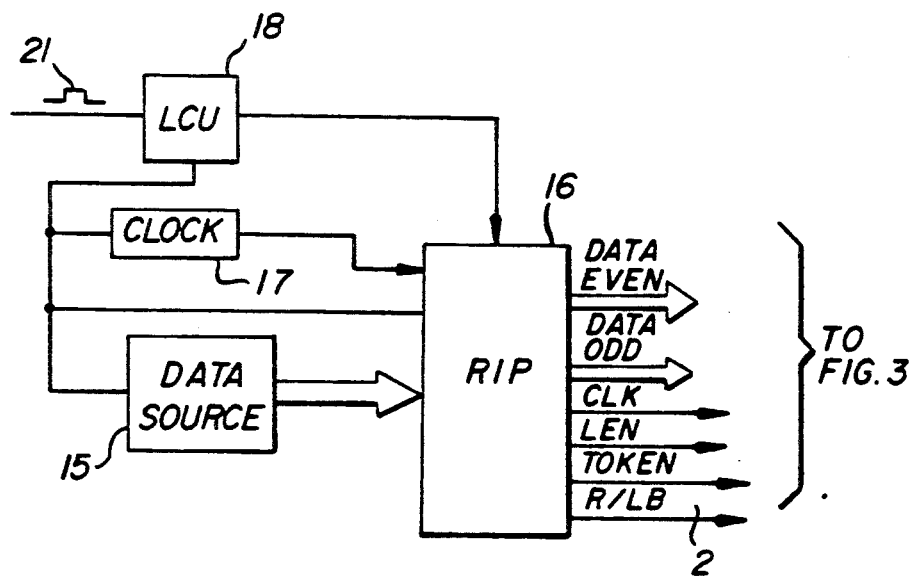
FIG. 2 is a block diagram of a circuit for providing signals to a non-impact printhead made in accordance with the invention and FIG. 3 represents a schematic of a circuit for a non-impact printhead made in accordance with the printer apparatus of the invention.
Figure 3:
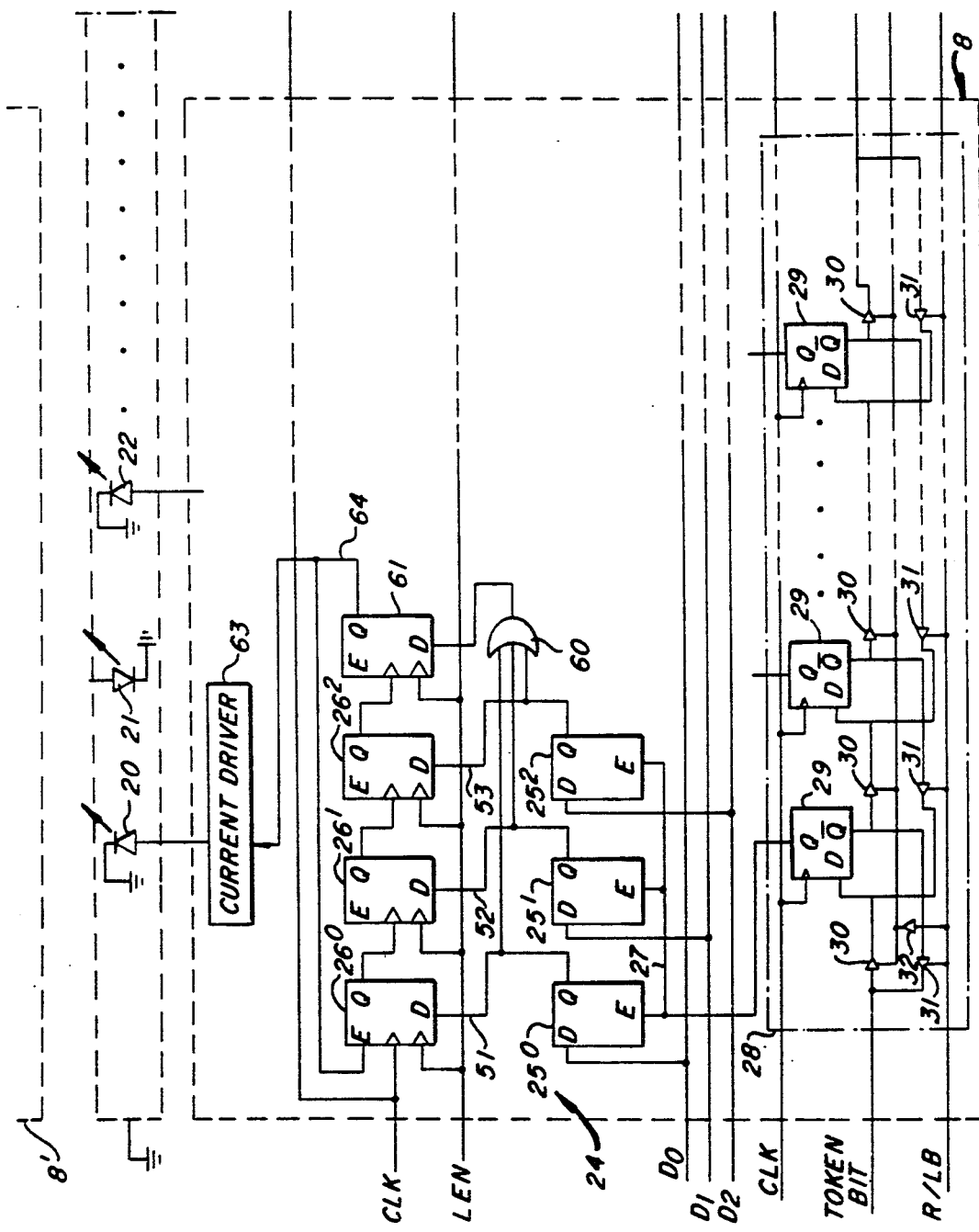

With reference now to FIGS. 2 and 3, a data source 15 such as a computer, word processor, image scanner or other source of digitized image data, provides image data signals to a data processor 16 which may in one example comprise a raster image processor. The data processor under control of clock pulses from a logic and control unit (LCU) 18 including a clock 17 provides a plurality of outputs including rasterized data outputs and control signals which are fed to the printhead. As will be described herein, the image data signals provided to the printhead relates to a desired ON time or period of enablement for a respective LED for the recording of a particular pixel or picture element. As is well known, the LED's are arranged in a row and alternately divided into odd and even-numbered LED's so that respective integrated circuit driver chips 8, 8' therefore are located on opposite sides of the line of LED's. For illustrative purposes, three LED's 20, 21, 22 are shown with the circuitry for driving LED 20 only being shown. As the circuitry is similar for the corresponding driver chips and for other LED's, further description thereof need not be provided. The image data signals provided to each driver circuitry associated with a particular LED during the printing of a single line of dots by the row of LED's is related to the desired pixel or dot size to be exposed onto the image receiver medium by that LED for that particular line of dots. As shown in the example of FIG. 3, three independent lines of data $D_0$ through $D_2$, comprising a data bus, provide a three bit digital image data signal that allows for greyscale variation of the output of each LED during each cycle of operation. Although the data lines $D_0$ through $D_2$ and other signal lines are shown passing through the driver chips, it will be appreciated that this is for the convenience of this description and that conventionally such lines are formed outside of the chips and connections made to these lines using "pads" or suitable connection points associated with the chips.

Suppose, for example, that the LED 20 is to be enabled for a time period equal to 5 clock periods. In response to a start of line pulse 21, the LCU causes the next line of data from the raster image processor to flow to the printhead three bits at a time. The three binary bits of data represent a pixel on time for a particular LED. Note that the pulse duration for each LED during each line of print is varied in accordance with its respective image data signals. In this embodiment, the LED's may be initially "balanced" such as by adjusting a "trim" resistor respectively associated with each LED. In lieu of balancing the LED's with trim resistors, correction for unequal light output may be provided by adjustment of the data in accordance with the characteristics of each LED. Thus, a programmable read only memory device or PROM may store the characteristics of each LED and data for that LED can be modified to provide a new multibit signal that represents data modified by the exposure characteristics of the LED. For example, for an LED that is a relatively strong light emitter the PROM would modify data bits for that LED to reduce the exposure that otherwise would be provided based solely on the data.

Still other circuitry for balancing the driving current to the LED's is described in U.S. Pat. No. 4,831,395 and U.S. application Ser. No. 07/290,012 and now U.S. Pat. No. 4,885,597.

The description of the circuitry forming a part of the driving circuitry to which the present invention is particularly directed will now be provided. In the example of the circuitry for the printhead shown in FIG. 3, the driving circuitry for the LED's are provided on opposite sides of the line of LED's 20. This is a known desirable arrangement for permitting LED's to be packed closer together to provide greater image resolution capabilities for the printer. As may be noted the circuit arrangement is an alternating one such that what may be called the even-numbered LED's have their respective driving circuitry located to one side of the line of LED's and what may be called the odd-numbered LED's have their respective driving circuitry located to the other side of the line of LED's. Typically, groups of, say, 64 of the odd numbered LED's will have their respective driving circuitry formed in a single integrated circuit chip, 8, and thus, for a printhead having 3584 LED's on the printhead, there may be 28 driving chips located on each side of the line of LED's. In order to save on production costs for these driving chips, it is desirable that they be identical. For the driving chips to be identical, although locatable on either side of the line of LED's, it is desirable for design simplicity that signals traversing the length of the printhead be programmably movable in either direction. Such signals primarily involve the data image signals. The image data signals are output by the data processor 16 in accordance with image data signals for the odd-numbered LED's and image data signals for the even-numbered LED's. Discussion will now be made with regard to the image data signals for the even-numbered LED's, since operation and circuitry for the odd-numbered LED's is identical. Data lines $D_0$–$D_2$ are independent lines each carrying a signal representing a digital bit (0 or 1) so that together their respective signals define a digital three bit number from decimal 0 to decimal 7. This image data signal is passed along lines $D_0$–$D_2$ which comprises an image data signal bus. Associated with each LED is a data register means 24 for latching data from this bus during each cycle of operation for printing a single line of dots. As will be described a token bit is used to enable a data register means associated with a particular LED to accept the data while other data register means associated with other LED's await their respective data.

The data register means 24 for each LED comprises a latch register $25^0$, $25^1$, $25^2$ and a flip-flop register $26^0$, $26^1$, $26^2$ for each of the three data lines. A respective latch and flip-flop are connected in a master-slave relationship. In response to a token bit signal at the enable input terminal E of the master latch $25^0$, an image data signal at the data input terminal D of this master latch will cause the output of that master latch, representing data for a previous pixel, to either change or remain the same depending upon the image data signal for the next pixel. It will be noted that the three master latches $25^0$, $25^1$, $25^2$ in the data register means associated with each LED are commonly connected by line 27 (output line of respective token bit flip-flop register 29) to simultaneously receive the token bit signal from the token bit shift register 28.

The token bit shift register 28 comprises a series of flip-flops 29 which have clock pulses applied to the clock terminals thereof and the signal representing the token bit input to the data input terminal of each. Note that the same token bit signal may be provided to both the even 28 and odd token bit shift registers (not shown). The Q or inverted outputs of each of these flip-flops 29 is connected to the data input terminal of the next flip-flop 29 in the series through a tri-state inverter 30. A duplicate connection is made in the opposite direction through tri-state inverters 31 so that programmable control may be made of the direction for shifting the token bit along the token bit shift register 28. In the example where the token bit is to be shifted from left to right in FIG. 3 for the Data Even half of the printhead, a line R/LB (right-left bit) is made logic high causing the output of its respective inverter 32 to go to logic low. This provides an enable signal to the tri-state inverters 30 and they operate as normal inverters. The tri-state inverters 31 are not enabled and provide a high impedance or near open circuit condition at their outputs. Thus, in response to clock pulses from the data processor 16 the token bit is passed from stage to stage of the token bit shift register 28 and accordingly outputted sequentially for enablement of the master latches 25 of a respective data register 24. With movement of the token bit from stage to stage of the shift register 28 the data bits occurring on lines $D_0$–$D_2$ are accepted by the data registers 24 in turn from left to right until all the 1792 data registers on this side of the printhead have acquired their respective three bits of data. A latch enable signal is then applied on line LEN to cause the respective slave latches $26^0$, $26^1$, $26^2$ to latch the data for the next pixel at their respective outputs. The master latches $25^0$, $25^1$, $25^2$ are now free to receive the image data signals for the next line of dots to be recorded.

For the operation of the Data Odd registers (not shown) the R/LB line is made logic low so that the token bit passes in the opposite direction relative to the driver chip 8' but still from left to right in FIG. 3. Thus, identical driving circuit chips are used for the odd and even numbered LED's by employing the programmable token bit to simplify and facilitate the circuits mounted on the printhead. The advantages to using identical circuits on different sides of the printhead is in addition to the obvious economic benefits of making them identical. With identical chips there is greater likelihood that their driving capabilities will be more identical to provide more uniform output by the LED's. In addition, the circuitry for formatting data to the printhead is simplified.

The master-slave latch arrangement as noted above permits data to be written into the master latch while the slave latch contains other data. Normally, for such purpose, each stage of a shift register would have three or more latches used to shift one bit of data. Thus, the use of the master-slave latch arrangement is also advantageous in reducing the number of required circuits thereby facilitating construction of the printhead.

The output of the latches is provided simultaneously over lines 51, 52, 53 that are used to preset a counter comprising presetable flip-flops $26^0$, $26^1$, $26^2$. These presetable flip-flops are preset through the data terminal marked D in response to a rising edge on the LEN line. Additionally, the data on lines 51, 52, 53 is input to an OR logic device 60. The output from the OR device is used as the data input for the flip-flop 61. Thus, if all the inputs on lines 51, 52, 53 are low, then the output of OR device 60 is low causing the Q output of flip-flop 61 to be low thereby insuring through logic controllers in the current driver 63 that the LED is not turned on. For an example of a logic controller in a current driver, see U.S. Pat. No. 4,831,395, the contents of which are incorporated herein. However, if the data inputs of lines 51, 52, 53 correspond to a non-zero value, the Q output of flip flop 61 will be set high on the occurrence of the LEN signal and will go high and will remain high until the flip-flops $26^0$, $26^1$, $26^2$ count down to the zero condition. The counting operation is implemented through the clock line which directly feeds into the first flip-flop $26^0$ and the flip-flops $26^0$, $26^1$, $26^2$ count to the 000 state at which time flip-flop 61 is reset. Note that the Q output of flip-flop $26^0$ is input to the clock input of flip-flop $26^1$. A similar relationship is provided as shown for flip-flops $26^1$ and $26^2$, as well as flip-flops $26^2$ and 61. The enable inputs of flip-flops $26^1$, $26^2$ and 61 are kept high to enable them. Thus, the data at the Q outputs of the counter registers cascades or ripples from flip-flop to flip-flop (left to right as shown) and in view of the binary weighting changes the count state represented by the Q outputs of registers $26^0$, $26^1$, $26^2$ with $26^2$ being the most significant bit and $26^0$ being the least significant bit. The operation is similar to asynchronous counters, for example, see Madhu, Electronics: Circuits and Systems, pages 768–771, published in 1985 by Howard W. Sams & Co. The Q output line 64 from flip-flop 61, which passes to the current driver then finally goes low and turns the LED 20 off. At this time, the counting process is also inhibited through line 67 which passes back to the enable input of flip-flop $26^0$ so that when line 64 goes low, the enable input of flip-flop $26^0$ goes low, causing the counting operation to stop. Thus, the LED is turned on for a period which is determined by the binary weighted values input on lines 51, 52, 53 during the time that the LEN pulse is used to load the flip-flops. Every LED element in the LED bar would have circuitry associated therewith that is similar to that shown so that it is possible to independently control the turn on duration of each LED for a period determined by its respective data and each LED can be operated simultaneously. Another variation on this technique involves making the clock pulses on line CLK come from a programmable clock wherein the clock spacings (e.g., 1.5, 2 or 2.5, 3.33 time units) are not uniform. This can enhance the dynamic range of the image by having the spacings between clock pulses shorter for shorter duration exposures and longer for longer duration exposures.

Thus, there is facilitated the incorporation of the token bit register 28 and data registers 24 in an integrated circuit chip 8 which excludes the need for comparators, and other circuit elements described in the prior art. As is well known, driving circuitry for each of an odd and even group of LED's may be mounted on modules that can be independently tested before being assembled on a printhead. With assembly of the modules on the printhead, electrical interconnections are made to allow passage of the token bit and other signals between adjacent chips.

The invention has been described in detail with particular reference to preferred embodiments thereof, but it will be understood that variations and modifications can be effected within the spirit and scope of the invention.

We claim:
1. A non-impact printer apparatus comprising:
a recording head having a plurality of recording elements for recording on a recording medium;
driving means for selectively energizing said plurality of recording elements in accordance with respective image data signals, said driving means including current driving means for generating currents to energize recording elements selected for energi- zation for recording of pixels, said driving means further including respective data register means associated with each recording element for storing said image data signals;

data bus means for carrying a multibit image data signal representing a pixel to be recorded;

means for commonly connecting said data bus means to said data register means;

a multistage shift register means for outputting sequentially at respective stages a token bit signal for sequentially selecting a respective data register means for accepting a multibit image data signal;

means for providing clock signals;

wherein the data register means associated with each recording element includes a series of cascaded registers with each register in said series storing a respective data bit of a multibit image data signal for recording a pixel and for shifting respective data bits from one register in said series storing a data bit for recording a pixel to another register in said series previously storing another data bit of said multibit data signal for recording said pixel in response to a clock signal;

and wherein the data register means associated with each recording element further includes an additional register responsive to one of said cascaded registers and receiving at one input, in serial order, data bits for recording said pixel and for outputting at an output terminal thereof serial data signals to the current driving means, said additional register further including a second input terminal; and means coupled to the second input terminal for generating, in response to a load signal loading the multibit image data signal into said cascaded registers, a signal resulting from a logic OR operation upon signals representing the data bits of the said multibit image data signal.

2. The apparatus of claim 1 and wherein the recording elements are light-emitting diodes.

3. The apparatus of claim 1 and including means for connecting said output terminal of the additional register to an input terminal of a first of the cascaded registers.

4. The apparatus of claims 1, or 3 and wherein said data bus means comprises a plurality of independent data lines, each carrying image data signals, and said data register means for each of said recording elements is coupled to said bus means to receive data signals from each of said data lines.

5. The apparatus of claim 4 and wherein said respective data register means comprises a master latch and a slave latch responsive to an output of said master latch and said master latch is coupled to said data bus means and changes the output in accordance with image data signals on said data bus means and in response to said token bit signal.

6. The apparatus of claim 5 and wherein said data register means comprises a plurality of master latch and slave latch combinations, each combination being connected to a separate data line of said data bus means, the master latches associated with a recording element also being commonly connected to simultaneously receive said token bit signal.

7. The apparatus of claim 6 and wherein said driving means includes means responsive to output signals of said slave latches in said respective data register means for driving a respective recording element for a time period related to said output signals of said slave latches.

* * * * *